Oct. 31, 1961  H. LEVINE  3,007,029
TEMPERATURE RESPONSIVE CONTROL FOR ELECTRICALLY HEATED DEVICES
Filed Feb. 17, 1958  3 Sheets-Sheet 2

Inventor:
Harvey Levine,
by Armand Cifelli
His Attorney.

Inventor:
Harvey Levine,
by Armand Cifelli
His Attorney.

United States Patent Office 3,007,029
Patented Oct. 31, 1961

3,007,029
TEMPERATURE RESPONSIVE CONTROL FOR ELECTRICALLY HEATED DEVICES
Harvey Levine, Fairfield, Conn., assignor to General Electric Company, a corporation of New York
Filed Feb. 17, 1958, Ser. No. 715,544
12 Claims. (Cl. 219—44)

My invention relates generally to temperature responsive controls for electrically heated devices, and particularly, but not limited, to such controls for such devices which normally operate in a temperature range of 50° F. to 450° F. For the purposes of clarity and simplicity in disclosing the invention, it will be illustrated and described as being incorporated in an electrically heated cooking appliance of the type that normally operates in the indicated temperature range. It should be understood, however, that the invention is not limited to the illustrated embodiment, and that it is well suited to be incorporated in many alternative electrically heated devices, particularly those which normally operate in the indicated temperature range; for example, it could be incorporated in an electrically heated iron.

Temperature responsive controls for electrically heated devices have received a considerable amount of attention from the art. One of the principal attributes of these controls that the art has striven for is that of temperature "sensitivity." The latter, which may be characterized as comprising operating speed and accuracy, is particularly desirable when the electrically heated device is of the type which in use requires precise temperature control. Electrically heated cooking appliances and electrically heated irons are examples of devices wherein it is necessary to precisely control the operating temperature. In some cooking appliances, such as a sauce pan, it is desirable when preparing certain foods, particularly aqueous solutions, that a precise simmering temperature be maintained. There are, of course, other situations involving the use of cooking appliances wherein it is desirable to precisely maintain a particular temperature or narrow temperature range. In using an electrically heated iron it is often necessary, particularly when certain delicate fabrics, such as the synthetic ones, are being ironed, to maintain precisely certain predetermined temperatures. The art has recognized the need for more sensitive controls, and it constantly exerts effort and energy to develop improved controls which are more sensitive than those which are known. Another attribute that is closely related to temperature sensitivity and which the art strives for in these controls is that of "quick recovery." This is, in one sense, the capacity to sensitively respond to a decrease in temperature, and, in another sense, the capacity to be utilized for a plurality of successive heating operations without significantly losing temperature sensitivity. In some controls for electrically heated devices it has been found necessary to devise ingenious ways of cooling temperature sensitive portions of the control between successive heating operations of the device. The art, therefore, constantly strives for the achievement of quick recovery in these controls while eliminating costly cooling arrangements. The attributes of sensitivity and quick recovery are factors which contribute to the overall efficiency and usefulness of these controls, and therefore, are individually and collectively important.

Along with the desire to achieve efficiency and usefulness, the art constantly strives to achieve the concomitant goal of minimizing the cost of manufacturing these controls. One of the factors which has heretofore contributed significantly to cost is the high labor expense of assembling the control components, and particularly the expense of adjusting and calibrating the controls in the factory after initial assembly. It will readily be understood that simplification of the construction of controls contributes somewhat to a reduction in their cost of manufacture, however, it has been found in practice that a very large element of cost is attributable to the failure of known controls to lend themselves to mass production techniques without requiring a considerable amount of adjustment and calibration after they are initially assembled. It is believed that this is principally due to the inherent characteristic of known controls of requiring considerable initial factory adjustment and calibration, because of the large number of critical dimensional relationships they possess wherein manufacturing tolerances are involved which effect operating accuracy to varying extents, hence, that are points where variable errors can occur which must be compensated for by adjustment and calibration. This is particularly true of many known controls which include motion multiplying mechanism. Because of their need for individual adjustment and calibration, such known controls may be characterized as not being "repeatable in manufacture." The latter expression is a short-hand way of stating that, because of their inherent design requirements, these known controls do not lend themselves to consistent and uniform reproduction by mass production techniques. The attributes of sensitivity, quick recovery and low cost have been achieved piecemeal by the art to a limited degree, however, the art still recognizes the need for greater efficiency and usefulness, and for cost reduction in these controls. Furthermore, the art has been unable to provide these attributes in a control which is operative throughout the temperature range of 50° F. to 450° F; the significance of the indicated temperature range is that many important electrically heated devices operate in this general temperature range. Although many proposals have been advanced by the art, to the applicant's knowledge, none has satisfied the desire for a low cost, sensitive control which possesses quick recovery, is repeatable in manufacture and is operative in the range of 50° F. to 450° F.

It has been another desire of the art to provide an improved control of the type discussed above which may be incorporated, for certain applications, in the form of a normally separate, detachable unit. This has been the case, particularly, in certain cooking appliances wherein it has been desired to provide a control in the form of a detachable unit which is selectively attachable to an electrical cooking vessel in such a manner that the vessel when separated from the control may be fully immersed in a cleaning solution to clean the vessel. Although the art has provided detachable temperature responsive controls of this general type, which are frequently referred to as "probe type controls," the art has not provided a probe type control which is operative over the indicated temperature range and which provides the multiple attributes of low cost, sensitivity, quick recovery and repeatability in manufacture.

The art, for example, has provided probe type controls which include thermal responsive means in the form of a bimetallic member. In this type of control it is necessary to incorporate motion multiplying mechanism to magnify the relatively small deflection of the bimetallic member which is produced by temperature changes so as to produce enough motion to make an adjustment in the electrical switch means of the control. The necessity of including motion multiplication mechanism results in additional critical dimensional relationships, i.e., points at which tolerances will effect the overall operating accuracy of the control, and therefore, points which require specific adjustment and calibration during manufacture. This, of course, results in added cost, for controls of this type do not have the advantage of manufacturing repeatability. Additionally, because thermal responsive bimetallic members react to the ambient temperature, i.e., the air about them, controls of this type do not respond to temperature changes as fast as controls which directly sense the temperature of the heated portion being controlled. It will be readily understood that controls which incorporate bimetallic members lag significantly in responding to temperature changes of the heated portion, because it is necessary for the air surrounding the bimetallic member to be heated up and, in turn, to heat up the bimetallic member before the latter will respond to temperature changes of the heated portion. It will be readily appreciated that if a control responds substantially directly to the heated portion, as when there is a direct conductive heat path between the thermal responsive means and the heated portion, faster response is achieved. In view of the foregoing, it will be apparent that probe type controls that employ bimetallic members are deficient in several important respects.

The art has also provided probe type controls wherein the differential expansion of two dissimilar materials in response to temperature changes of a heated portion is utilized to cause appropriate adjustments in the electrical switch means of a control. Such an arrangement might, for example, include thermal responsive means in the form of a tube made of a material having a high coefficient of thermal expansion which surrounds a rod made of a material having a low coefficient of thermal expansion, and use the differential axial expansion of the two parts in response to temperature changes to adjust the electrical switch means. Here too, the attribute of low cost is lacking, principally for the reason that controls of this type are not repeatable in manufacture. There are several areas in which manufacturing tolerances in dimensional relationships significantly influence the resultant operation of any given control, and therefore, these controls require individual adjustment and calibration after initial assembly. The need for adjustment and calibration is accentuated by the necessity of providing motion multiplying mechanism in controls incorporating this type of thermal responsive means, because the construction inherently produces a relatively small amount of motion. This type of thermal responsive means also includes the disadvantage of lacking sensitivity, because it is normally necessary to dispose a portion of the thermal responsive means beyond the immediate vicinity of the heated portion being controlled into the portion of the control where the electrical switch means is located. It will be understood that the physical location of a part of the thermal responsive means out of the immediate vicinity of the heated portion being controlled adversely affects the sensitivity of the control. It will be apparent that controls which incorporate this type of thermal responsive means are also deficient in several important respects.

The art has generally considered many materials for utilization as thermal responsive means. Mercury has been suggested, and it is utilized in some devices; however, this material is extremely difficult to work with, because it is toxic, and therefore, it does not lend itself to mass production techniques. Certain gases have been proposed, however, they are relatively poor thermal conductors and present major problems in sealing. Rubber has also been suggested, however, this material possesses the deficiency of being unable to operate over all of the indicated range of temperatures for the reason that rubber is likely to vulcanize at temperatures in excess of 250° F. Another material which has been suggested is gutta-percha, however, this material will not withstand the higher temperatures in the indicated range, and its coefficient of thermal expansion, although relatively high, is not sufficiently high for many applications, including those contemplated by the instant invention. In view of the foregoing, it will be apparent that prior to my invention there generally existed a definite need for better thermal responsive materials and, particularly, for such materials for use in temperature responsive controls, and more particularly, for use with devices operating in the temperature range of 50° F. to 450° F.

It is an object of this invention to provide a highly efficient and useful control for electrically heated devices, including those which normally operate in the temperature range of 50° F. to 450° F., which is extremely sensitive, possesses the quality of quick recovery, and is inexpensive to manufacture, the latter flowing from its ability to be reproduced uniformly on a mass production basis without requiring an appreciable amount of adjustment or calibration.

It is a further object of this invention to provide an improved control as set forth in the preceding paragraph in the form of a separate, detachable unit which may be selectively attached to and used with an electrically heated device.

It is a still further object of this invention to provide generally an improved control for electrically heated devices which is well suited for controlling such devices wherein precise control is necessary, such as: certain electrically heated cooking vessels wherein, for example, it is desired that highly delicate cooking processes which formerly had to be performed in a double boiler be performed in a single vessel; and an electrically heated iron wherein very delicate, synthetic fabrics may be ironed without causing damage.

Some of the objects of this invention are achieved by providing a temperature responsive control for an electrically heated device which includes a thermal responsive medium in the form of a volume of an incompressible material having a high coefficient of thermal expansion that is located in the immediate vicinity of a heated portion, which is being controlled, of the device and is thermally connected thereto by a direct path of conductive heat flow without any of it (the medium) being substantially removed from the thermal influence of said heated portion, whereby all of the medium is in good thermal conducting contact with the heated portion, is free of significant extraneous thermal influence and operates to sensitively, i.e., accurately and quickly, sense the temperature of said heated portion.

Other objects of the invention are achieved by providing a control as set forth in the preceding paragraph in the form of a normally separate, detachable unit having means for making electrical connection between said unit and the electrical heating means of the device which is controlled, and a projecting part which is adapted to be inserted into and received in a space formed in the device being controlled, and disposing the thermal responsive medium in the projecting part at such a location that all of the medium is located in the immediate vicinity of the heated portion of the device when the unit is attached to the device.

Other objects of the invention are achieved by providing a temperature responsive control for an electrically heated device which includes a quantity of an organopolysiloxane that is located in the control and associated with the other parts of the control in such a manner as to function as a thermal responsive medium which accurately and quickly senses the temperature of the heated portion, which is being controlled, of the device and operates to cause control of energization of the heating means of the device. For the sake of ease of exposition, and in recognition of its wide general usage, the term "silicone" will frequently be used hereinafter throughout the specification in place of the term "organopolysiloxane." It should be clearly understood, however, that, whenever used, the term "silicone is intended to be the equivalent of "organopolysiloxane."

Other objects of the invention are achieved in one form of the invention by utilizing in a temperature responsive control for an electrically heated device, a thermal responsive medium in the form of a silicone fluid, disposing the fluid in a container which is made of a good thermal conducting material and is disposed in good thermal conducting relationship with a heated portion, which is being controlled, of the device, retaining the fluid in the container by a biased piston, the latter being movably mounted in the container in response to thermally induced expansion and contraction of the fluid and having a member associated with it which is operatively associated with electrical switch means of the control, and providing a seal between the piston and the inner surface of the container which is made of a material that is compatible with the fluid, that will withstand the temperatures to which the control will be subjected and that will prevent escape of the fluid past the piston, but not bind the seal.

Other objects of the invention are achieved in another form of the invention by substituting for the silicone fluid, piston and seal of the arrangement set forth in the preceding paragraph, a solid mass of silicone rubber which is coated with a thin film of a silicone fluid of appropriate viscosity to function as a lubricant for the mass when the latter expands and contracts in response to temperature changes, whereby said mass acts directly on the member which is operatively associated with the electrical switch means of the control.

Other objects and further details of that which I believe to be novel and my invention will be clear from the following description and claims taken with the accompanying drawings wherein:

The invention is illustrated in the drawings as being embodied in an electrical cooking appliance and, more particularly, in the form of such an appliance which comprises a cooking vessel and a probe type control, i.e., a separate, detachable, control unit. Although the illustrated embodiment is the preferred form of the invention, it should be unequivocally understood at the outset that the invention may be embodied in other forms of electrically heated devices, particularly as hereinafter set forth.

By reference to the drawings it will be observed that the detachable control unit is designated generally by the reference number 10, and the cooking appliance vessel by the reference numeral 12. The illustrated cooking appliance is an electrical sauce pan, and is exemplary of the type of electrical cooking appliances with which the detachable control unit 10 may selectively be operationally associated. The vessel 12 comprises a generally cylindrical side wall 14, to which is secured a handle 16, and the flat bottom wall 18, to which is secured, as by brazing, a dished bottom cover 20, to which, in turn, are secured a plurality of supporting feet 22 and a socket forming wall 24 for receiving the control unit.

In the space formed by the vessel bottom wall 18 and the bottom cover 20, a bent, elongated, tubular, heating element 26 is located, which is secured to the underside of the vessel bottom wall, as by brazing, and has its ends 30 extending through openings 32 formed in a substantially flat, vertical portion 34 of the bottom cover 20. The heating element ends 30 are appropriately secured, sealed and electrically insulated at the points where they emerge from the cover portion 34. The construction for securing, sealing and electrically insulating the ends of the heating element forms no specific part of the instant invention, it being disclosed and claimed in the copending application of Otto F. Gerry and myself, Serial No. 733,574, filed May 7, 1958, and assigned to the assignee of the instant application. For the purposes of the present invention it is only necessary to understand that the heating element 26 has ends which project out of the cover portion 34, and that electrical terminal pins 36 are secured to the free ends 38 of the electrical conductor wire 40 which forms a part of the heating element and extends to the exterior of the bottom cover 20.

Also located in the space between the bottom wall 18 and the bottom cover 20, and secured, as by brazing, to the underside of said bottom wall in good thermal conducting relationship therewith, is a thermal conducting tube 42. The latter comprises a main cylindrical portion 44 having one end 46 positioned in an opening 48 formed in the cover portion 34 and extending to the exterior of the vessel, and its other end 50 swaged closed against the underside of the bottom wall 18. The swaging operation results in the end 50 being flared, as can best be seen in FIGS. 2 and 4.

Figures 2, 3, 4:
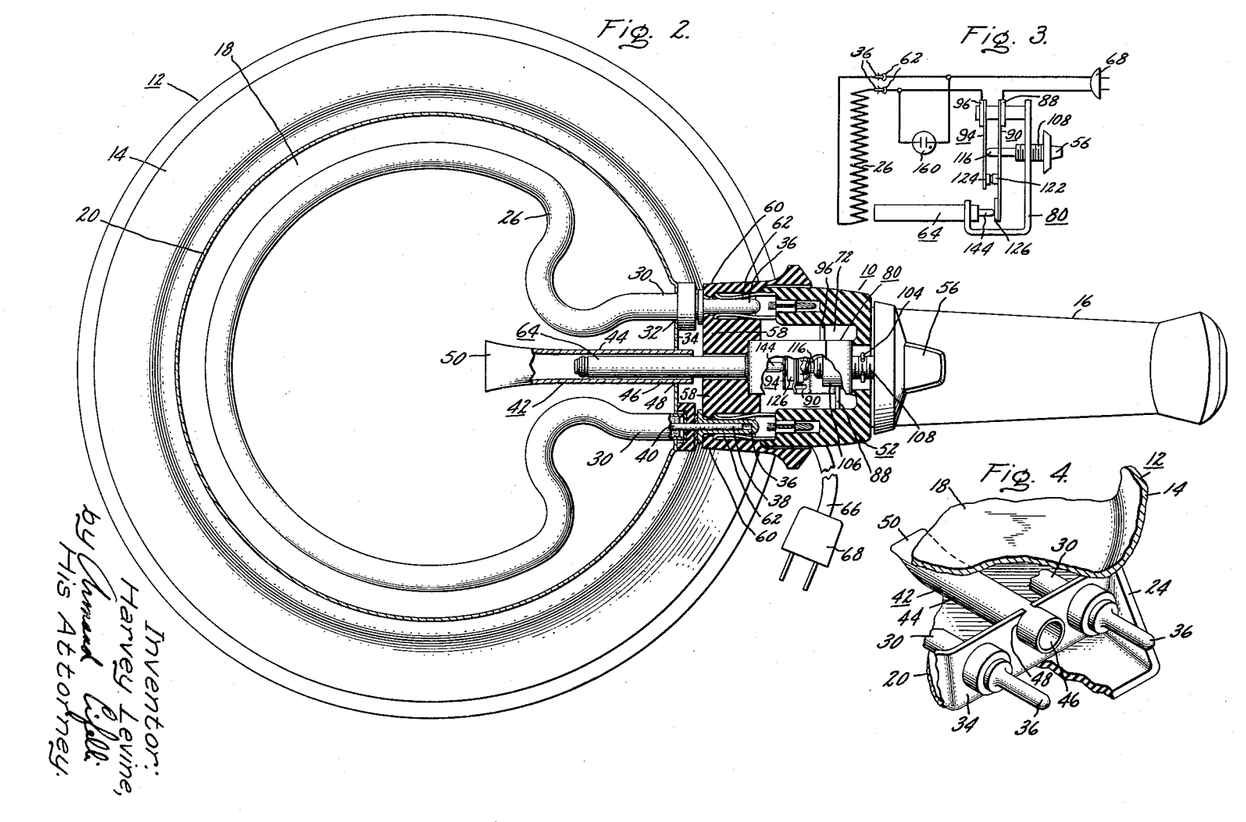
FIG. 2 is a sectional view taken substantially on line 2—2 of FIG. 1.
FIG. 3 is a wiring diagram showing the electrical components of the appliance illustrated in FIGS. 1 and 2 when in condition for operation.
FIG. 4 is a fragmentary perspective view of the cooking appliance vessel showing the means thereof for making electrical and thermal connection with the detachable control unit.

FIG. 4 clearly reveals the dispositional relationship of the terminal pins 36 and the end 46 of the thermal conducting tube as viewed from the exterior of the vessel when the control unit 10 is detached therefrom. Although the specific manner in which the thermal conducting tube 42 is secured to the underside of the bottom wall 18 is not critical, the aforementioned brazing has proved expedient in practice. Regardless of the manner of securement, it is extremely important that the thermal conducting tube 42 have the best possible thermal conducting relationship with the bottom wall 18, for it is the temperature of the bottom wall which it is desired to sense in order to control the operation of the cooking appliance; therefore, it is desirable to provide generous thermal conducting fillets between the thermal conducting tube 42 and the underside of the bottom wall 18.

The foregoing description relates primarily to the cooking appliance vessel. In summary, it should be noted that the principal structural features of the vessel are: the bottom wall 18, which comprises a portion which is to be heated and the temperature of which is to be sensed by the control unit; the heating element 26, which comprises a means for heating the portion to be heated; the terminal pins 36, which comprise means for making electrical connection with the control unit; and the thermal conducting tube 42, which comprises means for making thermal conducting connection between the heated portion of the vessel and a heat sensing portion of the control unit.

Figures 1, 5:
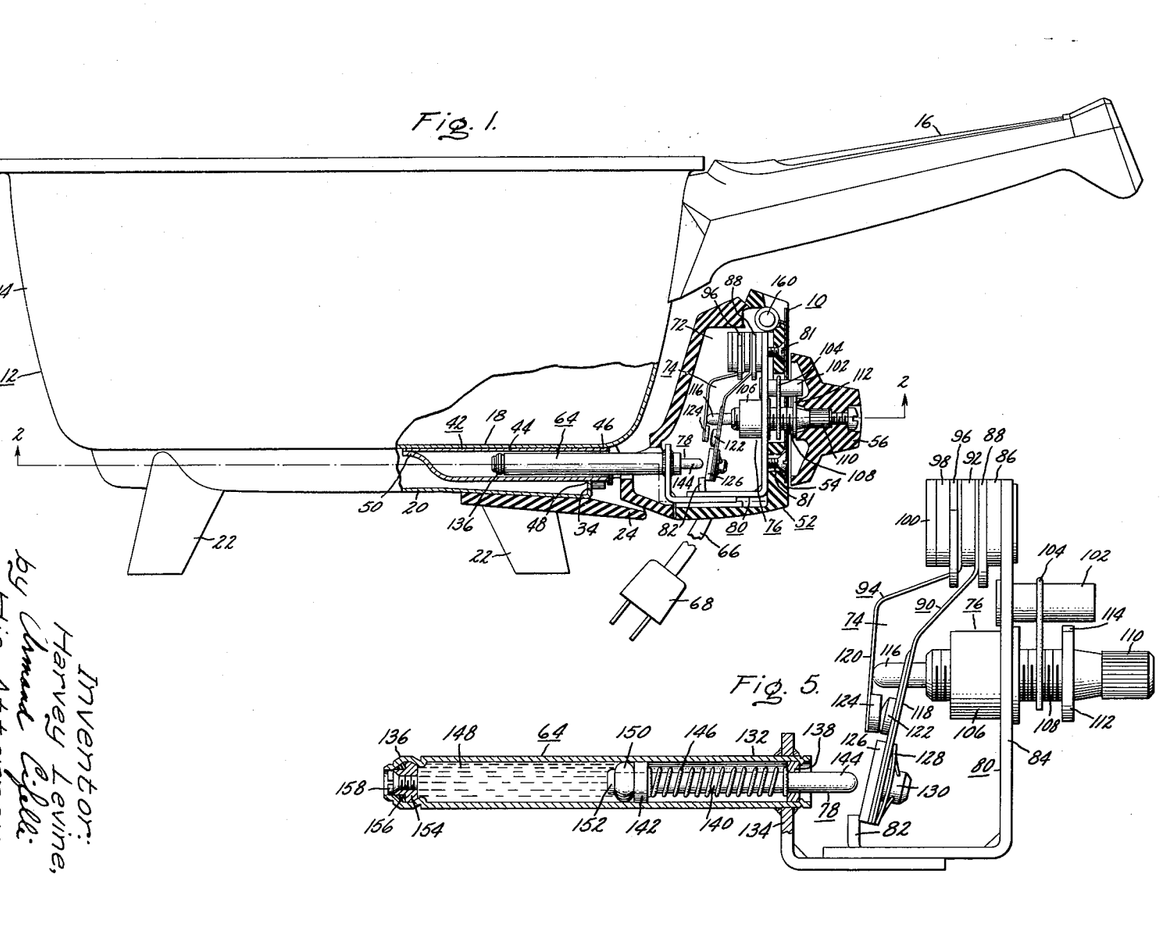
FIG. 1 is a side elevational view of an electrical cooking appliance which incorporates the instant invention, with portions of the appliance being broken away and shown in section.
FIG. 5 is a side elevational view with portions broken away and shown in section of the principal components of the control unit illustrated in FIGS. 1 and 2; this view is drawn on an enlarged scale.
Figure 6:
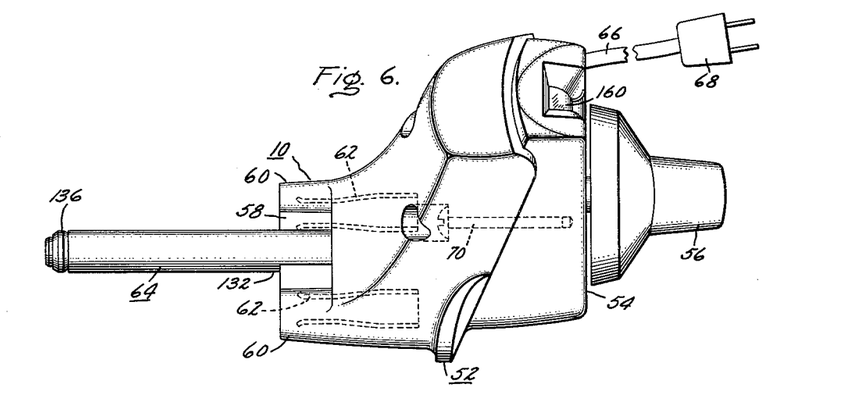
FIG. 6 is a perspective view on an enlarged scale of the FIG. 1 control unit shown by itself.

The control in the illustrated embodiment of the invention, as was stated above, is in the form of a separate, detachable unit 10, and it is illustrated by itself in FIG. 6, some of its principal operating components are illustrated by themselves in FIG. 5, and it is illustrated as attached to the cooking vessel in FIGS. 1 and 2.

In FIG. 6 the control unit 10 may be observed as it appears prior to being attached to the cooking vessel; it generally comprises a casing 52, which is made of an electrical insulating material, such as one of the many suitable, available plastic materials, for supporting all of the control components, manual control adjusting means for selecting an operating temperature for the cooking vessel, means for making electrical connection with the vessel, means for housing a thermal responsive medium and making thermal conducting connection with the heated portion, which is to be controlled, of the vessel, and means for making electrical connection with a conventional source of electricity. When viewed from its exterior, the control unit reveals a front wall 54 and a control knob 56, both of which, with other internal elements, comprise the manual control adjusting means; a rearward protuberance 58 having laterally spaced portions 60 which house female electrical connectors 62, which comprise the means for making electrical connection with the vessel; an elongated projecting probe 64, which comprises the means for housing a thermal responsive medium and making thermal conducting connection with the vessel heated portion being controlled, viz., the bottom wall 18 of the vessel; and the electrical cord 66 having an electrical plug 68 at its free end, which comprises means for making electrical connection with a conventional source of electricity.

The casing 52 may be made of a plurality of parts which are secured together to form the completed casing. The precise manner of fabricating and assembling the casing is not critical, however, the two-part casing illustrated which is assembled by the securing members 70 which may be screws or the like, and which forms an internal chamber 72, is a particularly effective one. As can be seen in FIG. 1, the chamber 72 houses electrical switch means which is designated generally by reference numeral 74, the internal elements of the control adjusting means which are designated generally by reference numeral 76, and a portion of the temperature responsive means for actuating the electrical switch means, which is designated generally by the reference numeral 78.

Much of the control structure is supported on a control bracket 80, which in turn is secured to the casing, as by threaded securing means 81, and supported thereby. The principal operating components of the control unit are the electrical switch means, the control adjusting means and the temperature responsive means for actuating the electrical switch means. For the purpose of facilitating an understanding of the construction of these components, they have been illustrated in FIG. 5 as removed from the casing and on an enlarged scale. The control bracket 80 is illustrated as comprising a generally J shape and including a flat horizontal wall and two vertically upstanding walls. The control bracket may be conveniently formed of two L-shaped pieces, as illustrated, which are secured together so as to form the J shape. This results in the horizontal wall being formed of two layers of material and allows for a tab 82 to be struck up out of one of the layers. This tab functions as a stop for one of the electrical switch elements as will subsequently become apparent.

The taller upstanding wall 84 of the bracket 80 near its upper end supports a stack of elements of the electrical switch means. As illustrated, this stack comprises the insulating spacer 86, the flat electrical terminal connector 88, the upper end of the large contact blade assembly 90, another electrical insulating spacer 92, the upper end of the small contact blade assembly 94, another flat electrical terminal connector 96, and still another electrical insulating spacer 98; the entire stack is retained in assembled condition by a retaining eyelet 100. It will be observed in FIG. 5 that the entire stack is disposed on one side of the upstanding wall 84 and is generally oriented on a horizontal axis. Spaced below the stack and rigidly secured to the wall 84 on its other side is a projecting pin 102 which functions as a stop, as will become apparent, and also as a support for the spring clip 104. Spaced below the pin 102 and rigidly secured to the wall 84 is an internally threaded bushing 106 that extends through the wall 84. Externally threaded adjusting shaft 108 is threadedly received in the bushing 106, has portions extending on both sides of the wall 84 and is adapted to be moved axially when it is rotated.

The spring clip 104 cooperates with the threads on the shaft 108 so as to retain it in any position to which it is adjusted. One end 110 of the shaft 108 extends out of the control casing and is splined and adapted to securely receive the control knob 56. The shaft 108 rigidly supports a ring 112 having a radially projecting lug 114 at a location between the splined end 110 and the spring clip 104; the lug 114 cooperates with the pin 102 so as to limit the rotation of the shaft 108 in each direction of rotation. The limit of rotation in one direction is the "off" position (see FIG. 1), and the limit in the other direction is the highest temperature setting. The other end of the shaft 108 supports an adjusting pin 116 which is made of an electrical insulating material and which extends through an opening in the contact supporting blade 118 of the large contact blade assembly 90 and impinges on the contact supporting blade 120 which forms a part of the small contact blade assembly 94.

The contact supporting blades 118 and 120 are elongated and bent, they support the electrical contacts 122 and 124, respectively, and they are made of spring metal and designed in accordance with known principle so as to be biased toward each other, thereby normally biasing said contacts into engagement. The contact supporting blade 120 is designed so as to exert a stronger force than the contact supporting blade 118, and therefore, it is able to overpower contact supporting blade 118 and always urge both contacting supporting blades toward the right as viewed in the drawings. It will be apparent that by forceably positioning the contact supporting blade 120 in a fixed position, as by an externally imposed force, such as the adjusting pin 116, the contacts 122 and 124 will initially engage each other at a position determined by the position of the contact supporting blade 120. Therefore, by rotating the adjusting shaft 108, by turning the control knob 56, the adjusting pin 116 may be axially advanced or retracted, within its axial limits fixed by the pin 102, and the position of the end of the adjusting pin 116 always contacts the contact supporting blade 120 and forceably positions it; the latter results in positioning of the contact supporting blade 118 with its contact 122 engaging contact 124 (in all positions except the "off" position) for the contact supporting blade 118 is always urged toward the contact supporting blade 120, as was stated above. Therefore, the adjustment of control knob 56 results in the joint movement of both contact supporting blades within their normal operating limits, and this results in the selection of a setting of a predetermined operating temperature for the device being controlled, as will become apparent subsequently.

The foregoing description of the electrical switch means of the control and the adjusting means therefor indicates the structure for and the manner of selectively locating the contacts 122 and 124 at the beginning of a controlled cooking operation to thereby selectively set the operating temperature desired. In order to provide for an "off" position, and to provide a means for disengaging the contacts when the bottom wall 18 of the cooking vessel reaches the preselected operating temperature which is set, a plate 126 of electrical insulating material is mounted on the lower end of the contact blade 118, as by the snap-on connector 128 which grips the mounting stub 130 which is formed integrally with the plate 126. It will be apparent that in order to disengage the contacts 122 and 124, under normal operating conditions, it is necessary to move the contact 122 away from the contact 124 (to the right as viewed in FIG. 5), for the position of the latter is fixed by the adjusting pin 116, and that this may be effected by exerting a force to the right on the plate 126; such a force may be exerted by the temperature responsive means. It will also be readily understood that the initial position of the contacts 122 and 124 determines the temperature at which the contacts will be disengaged by the temperature responsive means, because the initial position of the plate 126 determines the amount and actuating portion of the temperature responsive means has to move to the right prior to making contact with the plate 126 and moving it to the right so as to disengage the contacts.

In order to provide an "off" position for the electrical switch means when the cooking appliance is not used, the tab 82 of the control bracket 80 is located so as to contact the plate 126 at a point immediately before the extreme inner (left-hand as viewed in FIG. 5) position of the adjusting pin 116 is reached, and it thereby acts as a limit in the inner direction. It will be appreciated that on further inward movement of the adjusting pin 116, the contacts will be forceably disengaged due to the movement of the contact supporting blade 122 to the left and the inability of the contact supporting blade 118 to move any further to the left, because of its contact with the tab 82. The "off" position is illustrated in FIG. 1, wherein it will be observed that the lug 114 has been moved to one of its extreme positions, contacts 122 and 124 are forceably separated, and the plate 126 contacts the tab 82.

The temperature responsive means contemplated by the instant invention is principally incorporated in the probe 64, although it does include the portion 78 which extends out of the probe into the chamber 72. The probe 64 comprises a generally cylindrical tube which is made of extremely good thermal conducting material, such as brass, and which at one end 132 is rigidly secured to the shorter upstanding wall 134 of control bracket 80. The other end 136 of the probe is closed when the control is fully manufactured. The end 132 of the probe internally rigidly supports a washer-like retainer 138 which has a central opening that slidably receives a rod 140, which in turn is rigidly secured at its end which is mounted within the probe to the piston 142; its other end 144 extends into the chamber 72 toward the plate 126 and comprises an actuator for moving plate 126 to disengage the contacts. Between the piston 142 and the retainer 138, and disposed about the rod 140, is a coil spring 146 which is under compression at all times during normal operating conditions. Therefore, spring 146 constantly urges piston 142 to the left as viewed in the drawings. Between the closed end 136 of the probe and the piston 142 there is disposed a quantity of a thermal responsive medium. This medium is retained in the probe by the piston, which is biased in a direction to compress it, and it is extremely sensitive to temperature changes, because it has a high coefficient of thermal expansion, because it is substantially incompressible, and because it develops much force and motion on being expanded. On being heated, the medium expands substantially, i.e., its volume increases substantially and such volumetric expansion is translated into linear motion of the actuator 144 toward the plate 126 by the piston 142 and rod 140. The term substantially "incompressible" means that it does not require an appreciable amount of expansion on being heated up to overcome any compression which results from its being compressed by the piston 142. The significance of its property of developing much force and motion on expanding is that its force may act directly on the plate 126 without requiring motion multiplication mechanism. In summary, it will be apparent that the temperature responsive means comprises a thermal responsive medium, a container therefor, and means for translating expansion of said medium into linear movement of an actuator.

In the FIGS. 1–8 modification of the invention, which is one that has been tremendously successful in practice, I utilize a quantity 148 of a silicone fluid as the thermal responsive medium. A detailed discussion of the chemical aspects of this medium and other media which can be substituted for it will be made subsequently. In order to insert the silicone fluid into the probe 64 during manufacture, the retainer 138, spring 146, rod 140, piston 142, and an O-ring 150 are mounted within the probe 64. At this time during manufacture the end 136 of the probe is open and cylindrical, and the enumerated parts are readily positioned in the probe. The end 136 may then be worked on and deformed into the shape illustrated in FIG. 5 so as to mount the internally threaded plug 154, which is firmly positioned in the deformed portions of the probe end 136, with a seal 156 located so as to prevent leakage of silicone fluid between the probe and the plug. The proper quantity of silicone fluid is then inserted into the probe through the opening in the plug 154. The precise amount is dependent on the dimensional relationships of certain parts of the control, and the particular silicone fluid that is used, and may be ascertained readily in accordance with known principles. After the proper amount of silicone fluid has been inserted into the probe, the screw 158 may be threaded into the plug 154 into the position which it occupies in FIG. 5, and if desired permanently secured in position in any known way.

In order to prevent the escape of silicone fluid past the piston 142, the mentioned O-ring 150 is disposed on the rod 140 on the side of the piston which faces the silicone fluid. It is important that the O-ring 150 be made of a resilient material which is compatible with the silicone fluid, that is, one which will not be deleteriously effected by, or affect, the silicone fluid, and which will withstand the operating temperatures. In practice, silicone rubber has been found to be an excellent material for use in the O-ring. The O-ring 150 may be retained on the piston rod 140 in any convenient manner, as by the head 152 on the rod 140. In view of the fact that the silicone fluid is being utilized as a thermal responsive medium, and that the expansion and contraction of this fluid, acting through linearly movable means, which in the FIG. 5 modification takes the form of the piston and rod, is utilized to measure temperature changes, it is extremely important that the quantity of silicone fluid initially inserted into the probe remain substantially fixed throughout the life of the control, and that none of it escape out of the probe. In order to prevent the escape of silicone fluid past the piston 142, the O-ring 150 must have an outer diameter which is dimensionally related to the inner diameter of the probe 64 so as to cause a sufficient interference fit to prevent leakage of silicone fluid past the O-ring, but not one which impedes relative movement of the piston and O-ring.

In order to control the operation of the cooking vessel 12, it is necessary to insert the probe 64 of the control unit into the thermal conducting tube 42 of the cooking vessel while simultaneously causing the terminal pins 36 of the cooking vessel to be inserted into the female electrical connectors 62 of the control unit. Such connection results in the control unit and cooking vessel taking the positions illustrated in FIGS. 1 and 2. It will be observed that when so connected, all of the thermal responsive medium is disposed fully within the thermal conducting tube 42 within the confines of the space formed by the bottom wall 18 and the bottom cover 20, and that the probe 64 makes intimate direct contact with said tube throughout their contiguous length. This results in the location of the thermal responsive medium in what I have characterized as the "immediate vicinity" of the vessel heated portion being sensed and controlled. By the term "immediate vicinity" I intend to convey the thought that the thermal responsive medium is thermally connected to the bottom wall 18 of the vessel by an infinite number of direct paths of thermal conduction, and therefore, that the thermal responsive medium quickly and accurately responds to changes in the temperature of the bottom wall 18, and is free of any extraneous thermal influences, and therefore, responsive substantially only to the temperature at the bottom wall.

In order to assist in rendering the thermal responsive medium extremely sensitive to temperature changes of the bottom wall 18, the bottom cover 20 functions to create a space of stagnant air around the thermal conducting tube 42 which operates as a thermal insulator and eliminates the extraneous thermal effect of the ambient air about the cooking appliance, which would otherwise adversely effect the sensitivity of the thermal responsive medium if it were effective thereon. It should be noted that the socket forming wall 24 further assists in nullifying the effect of ambient air. It will, therefore, be apparent that notwithstanding the fact that the illustrated embodiment of the invention includes two detachable elements, that when they are operatively engaged, the control unit and the cooking vessel cooperate to produce a "conductive control," that is, a control wherein the heated portion being sensed and controlled has substantially exclusive, thermal conducting connection with the thermal responsive medium.

Figure 7:
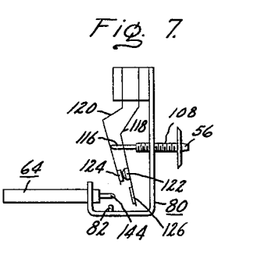
FIG. 7 is a schematic view of the FIG. 1 control unit showing the principal components thereof set for operation at a predetermined temperature.
Figure 8:
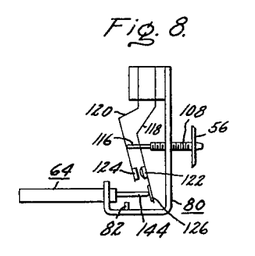
FIG. 8 is a view similar to FIG. 7 showing the control unit after the predetermined temperature has been reached.

Reference to FIGS. 7 and 8 will facilitate an understanding of a representative controlled heating operation of the cooking appliance. FIG. 7 schematically illustrates the positions of the principal components of the control unit at the time when the control unit has been set for the temperature at which it is desired to operate the appliance, but prior to the vessel reaching this temperature. In this position, the contacts 122 and 124 are engaged, and by reference to the wiring diagram of FIG. 3, which illustrates the condition of the electrical components of the cooking vessel and the control unit when they are operationally connected, it will be observed that when the contacts are closed, the heating element 26 is energized, along with an appropriate indicating lamp 160 (see FIG. 6). The indicating lamp 160 is always illuminated when the heating element 26 is energized, therefore, the user of the appliance can tell when the desired temperature is initially reached, when starting from a cold start, for the lamp will extinguish at that time. Although the details of the wiring of the electrical components of the control unit have not been physically illustrated, it is believed that they will be readily understood from the FIG. 3 wiring diagram. When the heating element 26 is energized, the cooking vessel and the bottom wall 18 thereof are heated by the heating element.

Because of the construction of the cooperating portions of the control unit and cooking vessel, and because of the properties of silicone fluids, the quantity 148 of a silicone fluid responds quickly and accurately to changes in the temperature of the bottom wall 18. An increase in temperature results in rapid expansion of the silicone fluid in all directions. In view of the fact that movement of the silicone fluid is restrained in all directions except a linear one which will force the piston 142 toward the retainer 138 against the force of the spring 146, all of the expansion of the silicone fluid is translated into a substantial linear force on the piston 142, and this results in substantial movement of the rod 140 and the physical displacement of the actuator end 144 of the rod 140 toward the plate 126 (the right as viewed in the drawings). On making a predetermined amount of movement, the actuator end 144 of the rod 140 contacts the plate 126 and forces the contact supporting blade 118 away from the contact supporting blade 120, and thereby disengages the contacts 122 and 124. It will readily be understood that the amount of movement of the actuator end 144 of the rod 140 which is necessary for causing contact disengagement at a predetermined temperature may be empirically determined. When the contacts disengage, as shown schematically in FIG. 8, the heating element 26 is deenergized and the indicating lamp 160 is extinguished. On cooling of the bottom wall 18 below the temperature for which the control unit is set, the contacts will re-engage, that is, return to their FIG. 7 positions, for the silicone fluid will quickly contract in response to a drop in temperature of the bottom wall, the piston spring 146 will urge the piston toward the silicone fluid (to the left as viewed in the drawings), and on a sufficient amount of such movement, the contact 122, because of the inherent bias of the contact supporting blade 118, re-engages the contact 124. As long as the connected control unit and cooking vessel are connected to a source of electricity by the electrical plug 68 in any conventional way, the heating element 26 will be accurately cycled, i.e., intermittently energized and deenergized, about the preselected temperature by the control unit. Whenever the electrical heating element 26 is energized, the lamp 160 will glow, and therefore, the user of the cooking appliance will know when the appliance has reached the predetermined temperature, because the lamp will intermittently glow at that time.

The temperature setting of the control unit which is illustrated schematically in FIGS. 7 and 8 is in the higher portion of the temperature range of control, for the plate 126 is positioned at a considerable distance from the actuator end 144. As was previously mentioned, the "off" position is illustrated in FIG. 1, and it will there be noted that the contacts cannot engage regardless of the position of the actuator end 144. The FIG. 5 setting may be characterized as being a very low temperature setting of the control unit for the plate 126 is positioned near the actuator end 144. Between the FIG. 5 position and the FIG. 7 position are an infinite number of different positions, each of which results in cycling of the heating element 26 about a different predetermined temperature which may be preselected by adjusting the control knob 56, for each results in positioning the plate 126 at a different distance from the actuator end 144, and the distance the actuator end has to move before it contacts and moves plate 126 determines the temperature at which the contacts disengage, and therefore, the temperature about which the heating element is cycled. It will be apparent that turning the control knob to a desired temperature marking, which may be part of an escutcheon that is mounted on the wall 54, results in advancing or retracting the adjusting pin 116, which in turn jointly moves the contact blade assemblies, including the plate 126, and the position of the latter determines the amount of linear movement of the actuator end 144 that is necessary before the contacts are disengaged, hence, the temperature about which the heating element is cycled by the control unit.

At this time it is believed important to note that numerous mechanical changes in structure could be made without departing from the spirit of the invention. Merely for the purpose of exemplification, several of these alternative constructions will be pointed out at this time. The first and major variation in physical structure that could be made, if desired, is that the control could be incorporated into the cooking appliance as a permanent and integral part thereof. This, of course, would result in losing the functional advantages of a detachable control unit, which, as was previously set forth, are significant, particularly in the cooking appliance field wherein the use of a detachable control unit enables the cooking vessel to be fully immersed in a cleaning solution when it is desired to clean it. If a permanent installation of the control were desired, it, of course, would be possible to eliminate some of the structure which provides for detachability. Also, it would be possible to eliminate the thermal conducting tube 42, and this would result in a slight improvement in the operation of the control for it would allow the probe 64 to be permanently connected directly to the bottom wall 18, hence, in slightly better thermal conducting contact therewith. Other arrangements for housing the silicone fluid could be employed, for example, the silicone fluid could be housed in a bag made of a resilient material that is compatible with silicone fluid, such as a silicone rubber bag, and the bag could be arranged to move an actuator which in turn would contact the plate 126. Another alternative arrangement is to house the silicone fluid in a bellows made of a resilient compatible material, such as silicone rubber, and utilize the motion of the bellows to operate a switch actuator. If desired, temperature indicating means, which would be operated by the thermal responsive medium and which would indicate the temperature of the heated portion being sensed, could be included.

Figure 9:
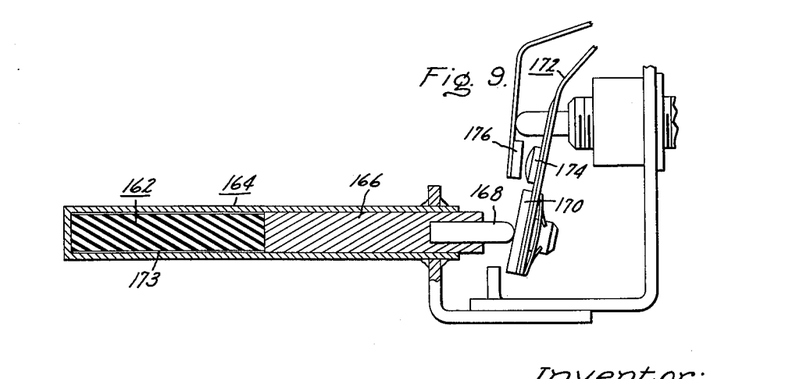
FIG. 9 is a view similar to FIG. 5 of a modified control unit.

A major modification of the control, principally pertaining to the thermal responsive medium, is illustrated in FIG. 9. It will there be observed that in place of the cylinder, silicone fluid, piston and O-ring arrangement of FIGS. 1–8, there has been substituted a mass 162 of a silicone rubber, which is located in one end of the cylindrical probe 164. Silicone rubber mass 162 is retained in the cylindrical probe by the slidable rod 166. An end of the rod 166 extends out of the probe 164 and supports an actuator pin 168 at its free end, which is adapted to cooperate with an insulator plate 170 that is carried on the contact carrying blade 172, and which operates in the same general manner as plate 126 of the modification of FIGS. 1–8. The remaining elements of the electrical switch means of the control illustrated in FIG. 9 are substantially the same in structure and function as their counterparts incorporated in the modification illustrated in FIGS. 1–8. The principal points of distinction revolve about and flow from the form of silicone which is utilized. The FIG. 9 modification utilizes a mass of a silicone rubber, whereas the FIGS. 1–8 modification utilizes a silicone fluid. In order to assist in translating the cumulative multi-directional expansion of the mass 162 of silicone rubber into smooth linear motion of the rod 166, a clearance is provided between the mass 162 and the inner surface of the probe 164 and the mass of silicone rubber is coated with a film 173 of a silicone fluid.

In all other respects, the operation of the FIG. 9 control is similar to that of the FIGS. 1–8. In operation the contacts 174 and 176 are intermittently engaged and disengaged when the temperature of the heated portion being controlled and sensed reaches the preselected temperature. It should be understood that the expansion and contraction of the mass 162 of silicone rubber moves the rod 166 and actuator pin 168 linearly, and thereby cooperates with the plate 170 to actuate the electrical switch means. Expansion of the mass 162 causes the pin 168 to move into contact with the plate 170 and to overpower and move the contact blade 172 to disengage the contacts; contraction of the mass 162 allows the contact blade 172 to return the contact 174 into engagement with contact 176, due to the bias of blade 172.

It will be apparent that in addition to providing a novel physical construction which produces a highly sensitive temperature responsive control, a salient feature of the instant invention resides in the novel utilization of silicones as thermal responsive media in a temperature responsive control. Silicones are materials which have very high coefficients of thermal expansion, are commercially available on an economical basis, can be handled in production readily, and are materials which due to their other physical properties allow for a substantial reduction in the cost of manufacturing these controls, because they allow for repeatability in manufacture. The latter virtue is very significant, and it flows in large part from the fact that silicones develop large force and large motion on being expanded, and, therefore, they lend themselves to being utilized to directly actuate electrical switch elements. This completely eliminates the need for motion multiplying mechanism which, as was set forth above, invariably requires costly adjustment and calibration after initial manufacture. Silicones also adapt themselves admirably to being incorporated in a conductive control, and these are generally the most sensitive controls. Further, because of their physical property of resisting compression, silicones quickly respond to temperature increases, and in the physical environments disclosed, they quickly translate their cumulative multi-directional expansion into substantial linear force and motion, and therefore, the control does not lag behind the temperature of the heated portion being sensed as controls using compressible materials would. It will, therefore, be apparent that silicones possess physical properties which contribute to the efficiency of the control in that they largely contribute to providing an extremely sensitive control; and silicones possess physical properties which allow for substantial savings in cost of manufacture, principally because they eliminate the need for motion multiplying mechanism, but also because they are commercially available on an economical basis, and are easily handled in manufacture.

The admirable qualities of a control which includes a thermal responsive medium in the form of a silicone are amply attested to in practice by the fact that controls constructed in accordance with the instant invention have satisfied the major dual purposes of this invention, viz., operational efficiency and low cost of manufacture. All commercially available forms of silicones will function admirably as the thermal responsive medium. As will be readily understood, the precise form of silicone employed will influence the physical structure associated with it. Applicant has produced many operative controls with a wide variety of silicones, and all of the controls were extremely sensitive. Applicant will herein disclose two specific examples of thermal responsive media which included silicones which were extremely successful in practice. It should be understood, however, that silicones in any of their known commercial forms, such as, silicone fluids (liquid), silicone rubbers (solid), and silicone gels (semi-solid) are operative.

*Example I*

In a control of the FIGS. 1–8 type, I have used a methylpolysiloxane fluid containing terminal trimethylsiloxy units and having a viscosity of 10,000 centistokes (when measured at about 27° C.) as the thermal responsive medium. An adequate disclosure of this fluid may be found in Patnode Patent No. 2,469,888 and particularly Example I thereof. In the instant example, the O-ring was made of cured, filled, methyl vinyl polysiloxane gum of the type described in Marsden Patent No. 2,445,794. More particularly, the O-ring was made of a polydimethylsiloxane gum containing a small molar concentration of silicon-bonded vinyl groups (as disclosed in the referred-to Marsden patent) and this gum was mixed with a finely divided silica filler and cured with an organic peroxide catalyst, for instance, benzoyl peroxide, bis-(2,4-dichlorobenzoyl) peroxide, etc. As previously pointed out, it is necessary in the modification illustrated in FIGS. 1–8 to provide a seal which will operate indefinitely under the operating conditions of temperature, motion and force involved in the use of the control. In order to effect such a seal, it was pointed out that an interference fit between the O-ring and the probe cylinder is necessary in order to prevent leakage of the silicone fluid. It has been found in practice that when using the foregoing materials, and with an O-ring having an external diameter of approximately .190" at room temperature, it is desirable that there be a minimum interference fit between the O-ring and the cooperating surface of the cylinder in the order of .003" to .009". The charge in viscosity of the fluid throughout the operational range of the control is relatively small, and therefore, leakage due to "thinning out" is not operationally significant. The first example set forth has proved to be extremely successful from both a technical and commercial point of view, in that it provides a low cost, quick, accurate control which has the capacity of quick recovery, is repeatable in manufacture and is operative over the entire range of temperatures between 50° F. and 450 °F.

In addition to the particular viscosity set forth in the first example, I have successfully used silicone fluids of the type set forth having viscosities in the range of 100 to 10,000 centistokes. Viscosities above 10,000 and up to 30,000 centistokes are thermally workable, however, they create a mechanical problem in sealing, for they force the O-ring to "ride" over some of the fluid, because they resist the wiping action of the O-ring, and therefore, are not as effective in practice as viscosities of 10,000 centistokes and under.

In the FIGS. 1–8 modification I have also successfully used a silicone gel in place of the silicone fluid set forth in Example I. The gel was prepared by oxidizing, by the application of heat, a high viscosity silicone fluid, such as the one set forth in Example I, until it formed a gel. However, in practice, the silicone fluid version of Example I has been found preferable to the silicone gel version.

*Example II*

A second example of a control which has proved to be successful in practice is that of the modification illustrated in FIG. 9. In this modification, the mass 162 of silicone rubber was made of a cured combination of a compound composed of a straight methylpolysiloxane gum (similar to that described in Agens Patent #2,448,756 and Warrick Patents #2,460,795 and #2,541,137), a finely divided silica filler, and a small amount of a curing agent, such as benzoyl peroxide, and 2% to 4% by weight of a methylpolysiloxane fluid containing terminal trimethylsiloxy units of the type disclosed in the referred-to Patnode patent and having a viscosity of 30,000 centistokes (when measured at about 27° C.). The film 174 of silicone fluid was also a methylpolysiloxane fluid containing terminal trimethylsiloxy units of the type disclosed in the referred-to Patnode patent and had a viscosity of 30,000 centistokes. It is desirable in the second example that there be a minimum clearance of .007" at room temperature between the diameter of the mass 162 and the inner surface of the probe 164.

In view of the foregoing, it is believed to be apparent that applicant has satisfied the objects of this invention in that he has provided a substantially improved control for electrically heated devices, including those which operate in the temperature range of 50° F. to 450° F., which has many significant advantages, including some which contribute to more efficient operation and some which contribute to a reduction in the cost of manufacture. It will be understood that the inventive concepts underlying applicant's invention may be incorporated in numerous alternative structural arrangements and environments. Further, it will, of course, be apparent to those skilled in the art that in addition to the silicone fluids and silicone rubbers described in the preceding examples, other silicone fluids and silicone rubbers may be employed, many of which are disclosed in the referred-to Patnode, Agens, Warrick, and Marsden patents, without departing from the scope of the invention. By reference, each of these patents is being incorporated into and made a part of the disclosure of the instant application. It is, therefore, my intention that the appended claims will cover all modifications and applications of the invention that do not depart from the true spirit and scope of my invention.

What I claim as new and desire to secure by Letters Patent of the United States is:

1. In an automatically controlled electrically heated device having a wall portion to be heated, electrical heating means for heating said wall portion, terminal means for detachably connecting said heating means in an electric power and control circuit, and thermally conductive wall means forming a substantially enclosed temperature sensing zone in the immediate vicinity of said wall portion, a detachable control unit arranged to be selectively attached to the device for supplying power to said heating means in an automatic controlled manner comprising: a casing of electrical and thermal insulating material; electric switch means mounted in said casing and arranged to be selectively placed in said circuit for controlling energization of said heating means; means on said casing arranged to be detachably connected to said terminal means for connecting said electric switch means in said circuit; a temperature sensing elongated tubular member of thermally conductive material supported by and projecting from said casing and arranged to be selectively detachably inserted into and substantially completely fill said temperature sensing zone; the end of said elongated tubular member remote from said casing being closed; a charge of thermal responsive medium having a high coefficient of thermal expansion disposed within said elongated tubular member so as to completely fill and be confined entirely to a longitudinal portion thereof that is adjacent the closed end thereof and arranged to be positioned wholly within said temperature sensing zone when said control unit is attached to the device, whereby all of said thermal responsive medium is in direct thermal conducting contact with said wall portion through said portion of said elongated tubular member and substantially limited to the immediate and direct thermal influence of said wall portion, thereby being free of extraneous heat influences and being capable of quickly and accurately sensing changes in the temperature of said temperature sensing zone; and movable actuating means made of a material that is not significantly affected by heat and rigid relative to the thermal responsive medium partially in said casing and partially in said elongated tubular member for confining said thermal responsive medium in said portion of said elongated tubular member and actuating said electric switch means in response to the volumetric expansion and contraction of said medium.

2. In an electrically heated device as defined in claim 1, said thermal responsive medium comprising a substantially incompressible fluid; and said movable actuating means comprising a piston slidably mounted longitudinally within said elongated tubular member and arranged to assist in confining said fluid in said portion of said elongated tubular member; a piston rod extending longitudinally of said elongated tubular member and connected at one of its ends to said piston and having its other end disposed within said casing in operative relationship with said electric switch means; and resilient means biasing said piston and piston rod toward the closed end of said elongated tubular member.

3. In an electrically heated device as defined in claim 2, said fluid comprising an organopolysiloxane.

4. In an electrically heated device as defined in claim 3, said elongated tubular member being cylindrical; said piston being circular; and an O-ring which is made of an organopolysiloxane rubber is supported by said piston, the dimensional relationship between the cooperating diameters of said O-ring and the inner surface of said elongated tubular member being such as to create an interference fit that prevents escape of said fluid past said piston and thereby confines said fluid in said portion of said elongated tubular member over an extended period of time, but does not bind said O-ring when said piston is moved.

5. In an electrically heated device as defined in claim 1, said thermal responsive medium comprising an organopolysiloxane.

6. In an electrically heated device as defined in claim 1, said thermal responsive medium comprising an organopolysiloxane fluid.

7. In an electrically heated device as defined in claim 1, said thermal responsive medium comprising an organopolysiloxane fluid having a viscosity within the range of 100 to 10,000 centistokes when measured at 27° C.

8. In an automatically controlled electrically heated cooking appliance having a wall portion to be heated, electrical heating means for heating said wall portion, terminal means for detachably connecting said heating means in an electric power and control circuit, and thermally conductive wall means forming an elongated generally horizontally extending space that comprises a substantially enclosed temperature sensing zone in the immediate vicinity of said wall portion, a detachable control unit arranged to be selectively attached to the cooking appliance for supplying power to said heating means in an automatic controlled manner comprising: a casing of electrical and thermal insulating material; an electric switch mounted in said casing and arranged to be selectively placed in said circuit for controlling energization of said heating means including two flexible arms having cooperating contacts thereon; means on said casing arranged to be detachably connected to said terminal means for connecting said electric switch in said circuit; a temperature sensing elongated tubular member of thermally conductive material supported by and projecting from said casing and arranged to be selectively detachably inserted into and substantially completely fill said space; the end of said elongated tubular member remote from said casing being closed; a piston having a piston rod secured thereto longitudinally slidably mounted within said elongated tubular member with an end of said piston rod projecting away from said piston into said casing into operative relationship with one of said flexible switch arms; resilient means biasing said piston and piston rod toward the closed end of said elongated tubular member; a charge of thermal responsive fluid having a high coefficient of thermal expansion disposed between said piston and the closed end of said elongated tubular member whereby said fluid is confined to and entirely fills a portion of said elongated tubular member adjacent the closed end thereof that is arranged to be positioned wholly within said space when said control unit is attached to the cooking appliance, thereby to sense substantially exclusively changes in the temperature of said temperature sensing zone; and manually adjustable means mounted on and accessible from the exterior of said casing for positioning the other flexible switch arm for preselecting the temperature at which said electric switch will open and close.

9. In an electrically heated device as defined in claim 1, said thermal responsive medium comprising an organopolysiloxane rubber.

10. In an electrically heated device as defined in claim 1, said thermal responsive medium comprising a mass of an organopolysiloxane rubber that is coated with a film of an organopolysiloxane fluid.

11. In an electrically heated device as defined in claim 1, said elongated tubular member being cylindrical; said thermal responsive medium comprising a mass of an organopolysiloxane rubber; and said movable actuating means comprising a slidable rod.

12. In an electrically heated device as defined in claim 1, said thermal responsive medium comprising a mass of an organopolysiloxane rubber that is dimensioned relative to said elongated tubular member so as to provide a clearance therebetween; and said mass is coated with a film of an organopolysiloxane fluid.

References Cited in the file of this patent

UNITED STATES PATENTS

| | | |
|---|---|---|
| 1,072,170 | Sargent | Sept. 2, 1913 |
| 1,318,168 | Newsom | Oct. 7, 1919 |
| 1,431,542 | Ross | Oct. 10, 1922 |
| 1,620,183 | Bersted | Mar. 8, 1927 |
| 1,662,817 | Bollmann et al. | Mar. 20, 1928 |
| 1,822,408 | King | Sept. 8, 1931 |
| 2,397,727 | Daudt | Apr. 2, 1946 |
| 2,492,261 | Bordelon | Dec. 27, 1949 |
| 2,817,732 | Reingruber | Dec. 24, 1957 |
| 2,830,166 | Loomis | Apr. 8, 1958 |
| 2,844,679 | Brewer et al. | July 22, 1958 |
| 2,856,489 | Bletz | Oct. 14, 1958 |
| 2,926,230 | Foster | Feb. 23, 1960 |

FOREIGN PATENTS

| | | |
|---|---|---|
| 130,053 | Australia | Nov. 6, 1948 |
| 204,091 | Australia | Sept. 20, 1956 |